(12) United States Patent
Sasaki et al.

(10) Patent No.: US 12,441,853 B2
(45) Date of Patent: Oct. 14, 2025

(54) PREPREG AND CARBON FIBER-REINFORCED COMPOSITE MATERIAL

(71) Applicant: TEIJIN LIMITED, Osaka (JP)

(72) Inventors: Mizuki Sasaki, Osaka (JP); Toru Kaneko, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 16/980,100

(22) PCT Filed: Mar. 12, 2019

(86) PCT No.: PCT/JP2019/009986
§ 371 (c)(1),
(2) Date: Sep. 11, 2020

(87) PCT Pub. No.: WO2019/176935
PCT Pub. Date: Sep. 19, 2019

(65) Prior Publication Data
US 2021/0024713 A1   Jan. 28, 2021

(30) Foreign Application Priority Data

Mar. 13, 2018 (JP) ................................. 2018-046085

(51) Int. Cl.
| | |
|---|---|
| *C08J 5/04* | (2006.01) |
| *C08J 5/24* | (2006.01) |
| *C08K 5/18* | (2006.01) |
| *C08K 5/21* | (2006.01) |

(52) U.S. Cl.
CPC ............... *C08J 5/042* (2013.01); *C08J 5/243* (2021.05); *C08J 5/249* (2021.05); *C08K 5/18* (2013.01); *C08J 2363/00* (2013.01); *C08K 5/21* (2013.01)

(58) Field of Classification Search
CPC . C08J 5/24; C08J 5/042; C08J 2363/00; C08J 5/249; C08J 5/243; C08K 5/18; C08K 5/21
USPC ........................................................ 523/468
See application file for complete search history.

(56) References Cited

U.S. PATENT DOCUMENTS

| | | | |
|---|---|---|---|
| 6,379,799 B1 | 4/2002 | Almen | |
| 2005/0043502 A1* | 2/2005 | Hikita | C08G 73/14 528/170 |
| 2006/0035088 A1 | 2/2006 | Takano et al. | |
| 2006/0263003 A1* | 11/2006 | Asai | H05K 1/0274 257/E31.127 |
| 2013/0217283 A1* | 8/2013 | Arai | C08G 59/3227 156/286 |
| 2014/0087178 A1 | 3/2014 | Arai et al. | |
| 2016/0280871 A1 | 9/2016 | Kaneko | |
| 2017/0043552 A1* | 2/2017 | Lenzi | B32B 5/022 |
| 2017/0362376 A1 | 12/2017 | Hughes et al. | |
| 2018/0265625 A1* | 9/2018 | Nagano | C08G 59/5006 |

FOREIGN PATENT DOCUMENTS

| | | | | |
|---|---|---|---|---|
| JP | 63-189426 A | | 8/1988 | |
| JP | 2005-213352 A | | 8/2005 | |
| JP | 2006104403 A | * | 4/2006 | ............ C08G 59/60 |
| JP | 2009-292976 A | | 12/2009 | |
| JP | 2009-292977 A | | 12/2009 | |
| JP | 2010-248379 A | | 11/2010 | |
| JP | 2010275492 A | * | 12/2010 | ............ C08G 59/50 |
| JP | 2011-190430 A | | 9/2011 | |
| JP | 2014-524940 A | | 9/2014 | |
| JP | 2015-117358 A | | 6/2015 | |
| JP | 2016-210860 A | | 12/2016 | |
| JP | 2017-536441 A | | 12/2017 | |
| WO | 2004/048435 A1 | | 6/2004 | |
| WO | 2015/080035 A1 | | 6/2015 | |
| WO | WO-2016087935 A1 | * | 6/2016 | ......... C08G 59/4021 |
| WO | WO-2017056653 A1 | * | 4/2017 | ............ C08G 59/20 |

OTHER PUBLICATIONS

Kuroki et al., JP 2006104403 A machine translation in English, Apr. 20, 2006. (Year: 2006).*
Matsuoka et al., JP 2010-275492 A machine translation in English, Dec. 9, 2010. (Year: 2010).*
International Search Report for PCT/JP2019/009986 dated Jun. 4, 2019 (PCT/ISA/210).

* cited by examiner

*Primary Examiner* — David T Karst

(74) *Attorney, Agent, or Firm* — Sughrue Mion, PLLC

(57) ABSTRACT

The present invention provides a prepreg including a fiber-reinforced substrate composed of a carbon fiber and an epoxy resin composition with which the fiber-reinforced substrate is partially or wholly impregnated, the prepreg being characterized in that the epoxy resin composition includes an epoxy resin, dicyandiamide, and an aromatic amine having a structure of Chemical Formula (1) in which at least one substituent other than a hydrogen atom is included in an ortho position with respect to an amino group.

13 Claims, No Drawings

PREPREG AND CARBON FIBER-REINFORCED COMPOSITE MATERIAL

CROSS REFERENCE TO RELATED APPLICATIONS

This application is a National Stage of International Application No. PCT/JP2019/009986 filed Mar. 12, 2019, claiming priority based on Japanese Patent Application No. 2018-046085, filed Mar. 13, 2018.

TECHNICAL FIELD

The present invention relates to a prepreg and a carbon fiber-reinforced composite material obtained by using the prepreg. In particular, it relates to a prepreg which can be molded in a short time and used to obtain a molded product having high water absorption resistance, and a carbon fiber-reinforced composite material having high water absorption resistance, obtained by using the prepreg.

BACKGROUND ART

A fiber-reinforced composite material (hereinafter referred to as "FRP"), which has a light weight, high strength, and high rigidity, is used in a wide variety of fields including, for example, sports and leisure applications such as a fishing rod and a golf shaft and industrial applications such as an automobile and an aircraft. For producing the FRP, a method of using an intermediate material (prepreg) in which a fiber-reinforced material layer composed of a long fiber such as a reinforced fiber is impregnated with a resin is preferably used. A molded product formed from the FRP can be obtained by cutting the prepreg into a desired shape and then shaping the cut prepreg, followed by curing by heating and pressurizing.

In the field of aircraft, dynamic characteristics such as heat resistance and impact resistance are required to be high. In general, the prepreg using an epoxy resin can be used to obtain a molded product having high dynamic characteristics. However, the prepreg using an epoxy resin requires a long molding time. Further, the molded product obtained by curing the prepreg using an epoxy resin has insufficient water absorption resistance, thus, in some cases, dynamic characteristics such as impact resistance are reduced by absorbing water at a high temperature.

Press molding enabling a short-time molding usually uses high-temperature and high-pressure conditions of from 100 to 150° C. and from 1 to 15 MPa (Patent Literature 1). These high-temperature and high-pressure conditions can shorten the curing time of the resin constituting the prepreg. Further, properly fluidizing the resin constituting the prepreg in the mold allows the gas included in the prepreg to be exhausted. However, when the press molding is performed under the high-temperature and high-pressure conditions, the increasing temperature of the resin constituting the prepreg significantly reduces the resin viscosity. As a result, the resin heavily flows out from a shear edge portion depending on the structure of the mold (hereinafter, a phenomenon in which the resin flows out from the inside of the prepreg by heating and pressurizing in the molding step is also referred to as "resin flow"). Thus, the obtained FRP has an appearance defect such as an unimpregnated portion with the resin composition (resin-starved portion) or fiber meandering, as well as a performance defect resulting therefrom.

Patent Literature 2 describes a method including using a high-viscosity epoxy resin and adding a thermoplastic resin to an epoxy resin as a method for reducing the resin flow. However, when the high-viscosity epoxy resin is used, the resin viscosity is also increased at normal temperature (25° C.). This causes difficulty in laminating work and the like and significantly reduces handling properties of the prepreg.

Patent Literatures 3 to 5 describes a prepreg for high-cycle press molding in which handling properties of the prepreg at normal temperature is improved and the resin flow is suppressed without reducing Tg and the curing rate. The resin used in the prepreg described in Patent Literatures 3 to 5 is obtained by dissolving a thermoplastic resin in a liquid epoxy resin for increasing the resin viscosity. However, the resin viscosity also increases at the time of producing the prepreg, thus there is a case where impregnation of the fiber-reinforced substrate layer with the resin is reduced and a void is formed in the FFP after molding.

In the field of aircraft, dynamic characteristics such as high heat resistance and impact resistance are required, and various methods have been proposed for the purpose of improving impact resistance and interlaminar toughness. In particular, many techniques of absorbing destruction energy by disposing a material different from the matrix resin between layers have been proposed (Patent Literature 6). However, the curing time of the resin generally takes 120 minutes or more, making it difficult to perform the short-time molding.

Further, in Patent Literatures 1 to 6, there is no mention regarding water absorption resistance of the obtained FRP.

CITATION LIST

Patent Literature

Patent Literature 1: WO 2004/48435 A
Patent Literature 2: JP 2005-213352 A
Patent Literature 3: JP 2009-292976 A
Patent Literature 4: JP 2009-292977 A
Patent Literature 5: JP 2010-248379 A
Patent Literature 6: JP 2011-190430 A

SUMMARY OF INVENTION

Technical Problem

An object of the present invention is to provide a prepreg in which a fiber-reinforced substrate layer can be sufficiently impregnated with a resin composition, which can be melded in a short time, and which can be used to produce a cured product having high water absorption resistance. Another object of the present invention is to provide a carbon fiber-reinforced composite material having high water absorption resistance, produced by using the prepreg.

Solution to Problem

The present inventors have found that the above problems can be solved by blending a certain aromatic amine in an epoxy resin composition constituting a prepreg, thereby completing the present invention.

The present invention to solve the aforementioned problems is as follows.

[1] A prepreg including:
a fiber-reinforced substrate composed of a carbon fiber;
an epoxy resin composition with which the fiber-reinforced substrate is partially or wholly impregnated, in which the epoxy resin composition includes an epoxy resin, dicyandiamide, and an aromatic amine represented by the following Formula (1),

[Chemical Formula 1]

Chemical Formula (1)

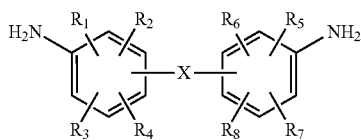

in which the aromatic amine has at least one substituent other than a hydrogen atom in an ortho position with respect to an amino group, and in Chemical Formula (1), $R_1$ to $R_8$ each independently represent any of a hydrogen atom, an aliphatic substituent having 1 to 6 carbon atoms, an aromatic substituent, and a halogen atom, at least one of the substituents is the aliphatic substituent having 1 to 6 carbon atoms, and X represents any of —$CH_2$—, —$CH(CH_3)$—, —$C(CH_3)_2$—, —S—, —O—, —CO—, —CONH—, and —C(=O)—.

The invention described in the above [1] is characterized in that the epoxy resin composition constituting the prepreg includes the certain aromatic amine. This aromatic amine has a substituent other than a hydrogen atom in at least one of ortho positions (A positions) with respect to an amino group.

[2] The prepreg according to [1], in which the epoxy resin composition further includes a urea-based accelerator.

[3] The prepreg according to [2], in which a total amount of the dicyandiamide and the urea-based accelerator is from 2 to 12 parts by mass with respect to 100 parts by mass of the epoxy resin.

[4] The prepreg according to [1], in which the epoxy resin composition further includes a thickening particle formed from a polymer having one or two or more monomer units selected from a group consisting of a methacrylic acid ester compound, an acrylic acid ester compound, and a vinyl compound.

[5] The prepreg according to [1], in which the epoxy resin composition further includes a thermoplastic resin.

[6] The prepreg according to [1], in which a gel time of the epoxy resin composition at 150° C. is 300 seconds or less.

[7] A carbon fiber-reinforced composite material obtained by curing the prepreg according to any one of [1] to [6], in which a 0° compressive strength reduction ratio is 30% or less.

[8] The carbon fiber-reinforced composite material according to [7], in which a water absorption is 1.5% by mass or less.

Advantageous Effects of Invention

The carbon fiber-reinforced composite material produced by using the prepreg of the present invention has high water absorption resistance. Further, the prepreg of the present invention including the urea-based accelerator has a short gel time and thus enables the short-time molding. Further, the prepreg of the present invention including the thickening particle has high press moldability and thus can stabilize the quality of CFRP.

DESCRIPTION OF EMBODIMENTS

The prepreg of the present invention includes:
a fiber-reinforced substrate composed of a carbon fiber, and
an epoxy resin composition with which the fiber-reinforced substrate is partially or wholly impregnated. The epoxy resin composition with which a layer of the fiber-reinforced substrate is partially or wholly impregnated is integrated with the fiber-reinforced substrate The epoxy resin composition includes an epoxy resin [A], dicyandiamide [C], and an aromatic amine represented by the following Formula (1),

[Chemical Formula 1]

Chemical Formula (1)

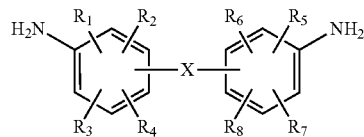

in which the aromatic amine has at least one substituent other than a hydrogen atom in an ortho position with respect to an amino group, and in Chemical Formula (1), $R_1$ to $R_8$ each independently represent any of a hydrogen atom, an aliphatic substituent having 1 to 6 carbon atoms, an aromatic substituent, and a halogen atom, at least one of the substituents is the aliphatic substituent having 1 to 6 carbon atoms, and X represents any of —$CH_2$—, —$CH(CH_3)$—, —$C(CH_3)_2$—, —S—, —O—, —CO—, —CONH—, and —C(=O)—.

The content ratio (RC) of the epoxy resin composition in the prepreg of the present invention is preferably from 15 to 60% by mass, more preferably from 20 to 50% by mass, particularly preferably from 25 to 45% by mass, on the basis of the total mass of the prepreg. When the content ratio is less than 15% by mass, there is a case where a void space or the like occurs in the obtained CFRP and its mechanical properties or the like are reduced. When the content ratio is more than 60% by mass, there is a case where the reinforcing effect by the reinforcing fiber becomes insufficient and mechanical properties or the like of the obtained CFRP are reduced.

The content ratio (RC) of the epoxy resin composition can be obtained by immersing the prepreg in sulfuric acid and eluting the resin composition with which the prepreg is impregnated. Specifically, the content ratio can be obtained by the following method.

First, the prepreg is cut out in a size of 100 mm×100 mm to produce a test piece and the mass of the test piece is measured. Next, this test piece of the prepreg is immersed in sulfuric acid, followed by boiling if necessary. This decomposes the resin composition with which the prepreg is impregnated, resulting in elution of the resin composition in sulfuric acid. Subsequently, the remaining fiber is filtered, washed with sulfuric acid, and then dried. After that, the mass of the fiber is measured. The content ratio of the resin composition is calculated from a change in mass before and after the decomposition operation using sulfuric acid.

The shape of the prepreg of the present invention may be a prepreg sheet in which a carbon fiber is formed into a sheet, shape or a strand prepreg in which a carbon fiber is formed into a strand shape.

The form of the prepreg of the present invention may have a structure that contains a reinforcing layer including a fiber-reinforced substrate and an epoxy resin composition with which the fiber-reinforced substrate is impregnated, and a resin coating layer laminated on the surface of the reinforcing layer. The thickness of the resin coating layer is preferably from 2 to 50 µm. When the thickness of the resin coating layer is less than 2 µm, there is a case where tack properties become insufficient and molding processability of the prepreg is significantly reduced. When the thickness of the resin coating layer is more than 50 µm, there is a case where it becomes difficult to wind the prepreg into a roll shape with a uniform thickness and molding accuracy is significantly reduced. The thickness of the resin coating layer is more preferably from 5 to 45 µm, particularly preferably from 10 to 40 µm.

(1) Fiber-Reinforced Substrate

The fiber-reinforced substrate uses a substrate composed of a carbon fiber. A polyacrylonitrile (PAN)-based carbon fiber is particularly preferable as it has excellent tensile strength.

In a case of using the PAN-based carbon fiber as the fiber-reinforced substrate, its tensile modulus is preferably from 100 to 600 GPa, more preferably from 200 to 500 GPa, particularly preferably from 230 to 450 GPa. Further, the tensile strength is from 2000 to 10000 MPa, preferably from 3000 to 8000 MPa. The diameter of the carbon fiber is preferably from 4 to 20 µm, more preferably from 5 to 10 µm. Using such a carbon fiber can improve the mechanical properties of the obtained FRP.

As the fiber-reinforced substrate is preferably formed into a sheet shape to be used. Examples of the fiber-reinforced substrate sheet include a sheet prepared by arranging a large number of reinforcing fibers in one direction, bi-directional woven fabric such as plain weave or twill weave, multi-axial woven fabric, non-woven fabric, a mat, knitted fabric, a braid, and a paper obtained by subjecting a reinforcing fiber to papermaking.

The thickness of the fiber-reinforced substrate in a sheet shape is preferably from 0.01 to 3 mm, more preferably from 0.1 to 1.5 mm. These fiber-reinforced substrates may include a known sizing agent in a known content.

The prepreg of the present invention may be a strand prepreg in which a carbon fiber is formed in a strand shape. The strand prepreg is produced by separating a unidirectional prepreg formed in a sheet shape. The width of the strand prepreg is preferably from 3 to 20 mm, more preferably from 6 to 10 mm. Further, the strand prepreg is preferably cut in its length direction to produce a short fiber prepreg. The fiber length is preferably from 5 to 100 mm, more preferably from 10 to 50 mm. The short fiber prepreg after cutting is preferably formed into a mat shape to produce a prepreg mat.

(2) Epoxy Resin Composition

The epoxy resin composition includes an epoxy resin [A], dicyandiamide [C], and an aromatic amine [B]. The epoxy resin composition preferably includes a urea-based accelerator, a thickening particle [E] and a thermoplastic resin [D]. Note that the epoxy resin [A] included in the epoxy resin composition of the present invention is in an uncured to semi-cured state. After the epoxy resin [A] is cured, it is referred to as a cured product of the epoxy resin composition or simply as a cured product.

The gel time of the epoxy resin composition at 150° C. is preferably 300 seconds or less, more preferably 280 seconds or less, further more preferably 250 seconds or less. When the gel time is 300 seconds or less, the molding rate can be increased. The gel time can be adjusted by adding the urea-based accelerator.

(2-1) Epoxy Resin [A]

Examples of the epoxy resin [A] used in the present invention include a bifunctional epoxy resin such as a bisphenol epoxy resin, an alcohol epoxy resin, a biphenyl epoxy resin, a hydrophthalic acid epoxy resin, a dimeric acid epoxy resin, or an alicyclic epoxy resin; a glycidyl ether epoxy resin such as tetrakis(glycidyloxyphenyl)ethane or tris(glycidyloxyphenyl)methane; a glycidyl amine epoxy resin such as tetraglycidyl diaminodiphenylmethane; a naphthalene epoxy resin; and a novolac epoxy resin such as a phenol novolac epoxy resin or a cresol novolac epoxy resin.

Further, a polyfunctional epoxy resin such as a phenol epoxy resin can be mentioned. Further, various modified epoxy resins such as a urethane-modified epoxy resin and a rubber-modified epoxy resin can also be used.

Especially, an epoxy resin having an aromatic group within the molecules is preferable, and an epoxy resin having either a glycidyl amine structure or a glycidyl ether structure is more preferable. Further, an alicyclic epoxy resin can be also suitably used.

Examples of the epoxy resin having a glycidyl amine structure include various isomers of N,N,N',N'-tetraglycidyldiaminodiphenylmethane, N,N,O-triglycidyl-p-aminophenol, N,N,O-triglycidyl-m-aminophenol, N,N,O-triglycidyl-3-methyl-4-aminophenol, and triglycidylaminocresol.

Examples of the epoxy resin having a glycidyl ether structure include a bisphenol A epoxy resin, a bisphenol F epoxy resin, a bisphenol S epoxy resin, a phenol novolac epoxy resin, and a cresol novolac epoxy resin.

These epoxy resins may have a non-reactive substituent in an aromatic ring structure or the like as needed. Examples of the non-reactive substituent include an alkyl group such as methyl group, ethyl group, or isopropyl group, an aromatic group such as phenyl group, an alkoxyl group, an aralkyl group, and a halogen group such as chlorine or bromine.

Examples of the bisphenol epoxy resin include a bisphenol A resin, a bisphenol F resin, a bisphenol AD resin, and a bisphenol S resin. Specific examples thereof include jER815, jER828, jER834, jER1001, and jER807 (trade names) manufactured by Mitsubishi Chemical Corp.; EPOMIC R710 (trade name) manufactured by Mitsui Petrochemical Industries, Ltd.; and EXA1514 (trade name) manufactured by Dainippon Ink and Chemicals, Inc.

Examples of the alicyclic epoxy resin include Araldite CY-179, CY-178, CY-182, and CY-183 (trade names) manufactured by Huntsman Advanced Materials.

Examples of the phenol novolac epoxy resin include jER152 and jER154 (trade names) manufactured by Mitsubishi Chemical Corp.; DEN431, DEN485, and DEN438 (trade names) manufactured by Dow Chemical Company; and EPICLON N-740 (trade names) manufactured by DIC Corp. Examples of the cresol novolac epoxy resin include Araldite ECN1235, ECN1273, and ECN1280 (trade names) manufactured by Huntsman Advanced Materials; EOCN102, EOCN103, and EOCN104 (trade names) manufactured by Nippon Kayaku Co., Ltd.; Epo Tohto YDCN-700-10 and Epo Tohto YDCN-704 (trade names) manufactured by Nippon Steel & Sumikin Chemical Co., Ltd.; and EPICLON N-680 and EPICLON N-695 (trade names) manufactured by DIC Corp.

Examples of the epoxy resin having a glycidyl amine structure include SUMI-EPOXY ELM-434, SUMI-EPOXY ELM-120, and SUMI-EPOXY ELM-100 (trade names) manufactured by Sumitomo Chemical Company; Araldite MY0500, Araldite MY0510, Araldite MY0600, Araldite MY720, Araldite MY721, Araldite MY9512, Araldite MY9612, Araldite MY9634, and Araldite MY9663 (trade names) manufactured by Huntsman Advanced Materials; jER604 and jER630 (trade names) manufactured by Mitsubishi Chemical Corp.; and Bakelite EPR494, Bakelite EPR495, Bakelite EPR496, and Bakelite EPR497 (trade names) manufactured by Bakelite AG.

Examples of the various modified epoxy resins include a urethane-modified bisphenol A epoxy resin such as ADEKA RESIN EPU-6 or EPU-4 (trade names) manufactured by Asahi Denka Co. Ltd.

These epoxy resins can be appropriately selected and used solely or in a combination of two or more thereof. Of those, the bifunctional epoxy resin represented by a bisphenol type includes resins of various grades from a liquid form to a solid form depending on a difference in the molecular weight. Thus, those resins are preferably blended for the purpose of adjusting the viscosity of the resin composition.

The epoxy resin having a glycidyl amine structure is preferably used for improving heat resistance of the CFRP. The blending amount of the epoxy resin having a glycidyl amine structure is preferably from 40 to 85 parts by mass, more preferably from 45 to 80 parts by mass, with respect to 100 parts by mass of the total epoxy resin [A]. When the blending amount of the epoxy resin having a glycidyl amine structure is less than 40 parts by mass, sufficient heat resistance may not be obtained. When the blending amount is more than 85 parts by mass, although heat resistance is sufficiently obtained, the resin becomes brittle, thus the obtained CFRP may not have sufficient impact resistance.

(2-2) Aromatic Amine [B]

The aromatic amine [B] used in the present invention is a compound represented by the following Formula (1),

[Chemical Formula 1]

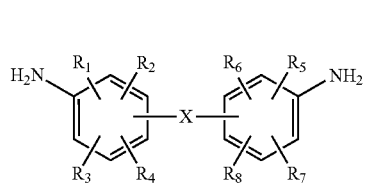

Chemical Formula (1)

in which the aromatic amine has at least one substituent other than a hydrogen atom in an ortho position with respect to an amino group, and in Chemical Formula (1), $R_1$ to $R_8$ each independently represent any of a hydrogen atom, an aliphatic substituent having 1 to 6 carbon atoms, an aromatic substituent, and a halogen atom, at least one of the substituents is the aliphatic substituent having 1 to 6 carbon atoms, and X represents any of —CH$_2$—, —CH(CH$_3$)—, —C(CH$_3$)$_2$—, —S—, —O—, —CO—, —CONH—, and —C(=O)—.

Specific examples include compounds represented by the following Formulae (2) to (5).

[Chemical Formula 2]

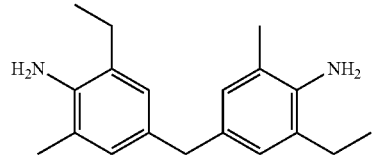

Chemical Formula (2)

[Chemical Formula 3]

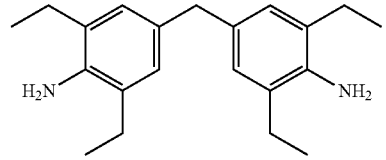

Chemical Formula (3)

[Chemical Formula 4]

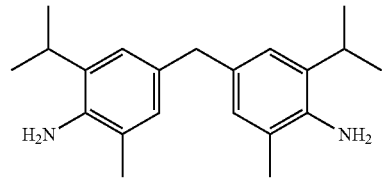

Chemical Formula (4)

[Chemical Formula 5]

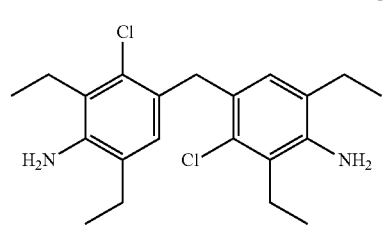

Chemical Formula (5)

The blending amount of the aromatic amine [B] in the epoxy resin [A] is from 3 to 20 parts by mass, preferably from 5 to 15 parts by mass, with respect to 100 parts by mass of the epoxy resin [A]. When the blending amount of the aromatic amine [B] is 3 parts by mass or more, the cross-linking density becomes high and water absorption resistance of the cured product obtained by curing the epoxy resin composition can be improved. When the blending amount of the aromatic amine [B] is 20 parts by mass or less, water absorption resistance of the cured product obtained by curing the epoxy resin composition can be improved without inhibiting quick curability of the resin.

(2-3) Dicyandiamide [C]

In the present invention, dicyandiamide [C] is used as a curing agent of the above epoxy resin as it has excellent curability and gives a cured product excellent in physical properties.

Specific examples of dicyandiamide (DICY) include jER-CURE DICY 7 and DICY 15 (trade names) manufactured by Mitsubishi Chemical Corp.

DICY is preferably used in combination with a urea-based curing accelerator. Solubility of DICY in the epoxy resin is not so high, thus DICY needs to be heated to a high temperature of 160° C. or higher to be sufficiently dissolved. However, when DICY is used in combination with the urea-based curing accelerator, the dissolution temperature can be lowered.

Examples of the urea based curing accelerator include phenyl dimethyl urea (PDMU) and toluene bisdimethyl urea (TBDMU).

The blending amount of dicyandiamide [C] in the epoxy resin [A] is preferably from 2 to 5 parts by mass, more preferably from 2 to 4 parts by mass, with respect to 100 parts by mass of the epoxy resin [A]. When the blending amount of dicyandiamide [C] is 2 parts by mass or more, the crosslinking density becomes sufficient, and the sufficient curing rate can also be obtained. When the blending amount of dicyandiamide [C] is 5 parts by mass or less, it becomes possible to prevent a reduction in mechanical properties of the cured product and a defect such as cloudiness of the cured product caused by the excessive amount of the curing agent.

When dicyandiamide [C] and the urea-based curing accelerator (PDMU, TBDMU, or the like) are used in combination, it is preferable that the blending amount of dicyandiamide [C] is from 2 to 5 parts by mass and the blending amount of the urea-based curing accelerator is from 2 to 7 parts by mass with respect to 100 parts by mass of the epoxy resin [A]. However, the total amount of dicyandiamide [C] and the urea-based curing agent is preferably from 2 to 12 parts by mass. When the total amount of dicyandiamide [C] and the urea-based curing accelerator is 2 parts by mass or more, the crosslinking density becomes sufficient and the sufficient curing rate can also be obtained. When the total amount of dicyandiamide [C] and the urea baaed curing accelerator is 12 parts by mass or less, it becomes possible to prevent a reduction in mechanical properties of the cured product and a defect such as cloudiness of the cured product caused by the excessive amount of the curing agent. The total amount of dicyandiamide [C] and the urea-based curing agent is more preferably from 3 to 10 parts by mass.

(2-4) Thermoplastic Resin [D]

As the thermoplastic resin [D], a group of thermoplastic resins belonging to engineering plastics, such as polysulfone, polyether imide, polyphenylene ether, polyamide, polyacrylate, polyaramide, polyester, polycarbonate, polyphenylene sulfide, polybenzimidazole, polyimide, polyether sulfone polyketone, polyether ketone, polyether ether ketone, and polyvinyl formal, is more preferably used. Polyimide, polyetherimide, polysulfone, polyether sulfone, polyvinyl formal, and the like are particularly preferably used as they are excellent in heat resistance, toughness, and handling properties.

The blending form of the thermoplastic resin [D] can take any form. For example, the thermoplastic resin [D] in powdery form may be kneaded and dispersed in the epoxy resin [A] using a kneader or the like, or the thermoplastic resin [D] may be dissolved in the epoxy resin [A] by, for example, heating the thermoplastic resin in the epoxy resin [A]. It is preferable to use both the thermoplastic resin which is dissolved in the epoxy resin [A] and the thermoplastic resin which is dispersed in the epoxy resin [A] in the epoxy resin composition.

The particle diameter of the thermoplastic resin [D] in powdery form is preferably from 0.2 to 100 μm, more preferably from 0.5 to 80 μm.

The blending amount of the thermoplastic resin [D] is preferably from 5 to 45 parts by mass, more preferably from 10 to 40 parts by mass, with respect to 100 parts by mass of the epoxy resin [A].

(2-5) Thickening Particle [E]

The thickening particle [E] of the present invention is a particle which has an effect of thickening the epoxy resin composition by swelling at a certain temperature when the particle is mixed to the epoxy resin composition and heated. Specifically, the thickening particle is a resin particle which increases the viscosity (viscosity after being held at 150° C. for 30 seconds) of the epoxy resin composition by 10 times or more, preferably 50 times or more, when the resin particle is mixed in an amount of 10% by mass with respect to the epoxy resin composition.

Examples of the thickening particle [E] include a particle obtained by copolymerizing a single or a plurality of unsaturated compounds and a crosslinkable monomer. Although not particularly limited thereto, it is desirable to include a resin having at least one of an acrylic acid ester compound, a methacrylic acid ester compound, and a vinyl compound as a monomer unit.

The prepreg of the present invention including the thickening particle [E] uses the resin composition originally having a low viscosity, thus the fiber-reinforced substrate layer is easily impregnated with the resin. Then, during heat molding, the viscosity of the resin composition is increased by using the thickening particle [E] in a predetermined temperature zone. Thus, the epoxy resin composition has a temperature zone in which the viscosity change becomes moderate. Molding in this temperature zone can reduce the resin flow from the inside of the prepreg. As a result, the CFRP produced by using the prepreg of the present invention is less prone to a molding defect such as resin starving.

The acrylic acid ester compound used in the thickening particle [E] refers to a compound having an acrylic acid ester structure or a derivative thereof. Examples thereof include methyl acrylate, ethyl acrylate, n-propyl acrylate, isopropyl acrylate, n-butyl acrylate, isobutyl acrylate, sec-butyl acrylate, t-butyl acrylate, n-hexyl acrylate, and cyclohexyl acrylate.

The methacrylic acid ester compound used in the thickening particles [E] refers to a compound having a methacrylic acid ester structure or a derivative thereof. Examples thereof include methyl methacrylate, ethyl methacrylate, n-propyl methacrylate, isopropyl methacrylate, n-butyl methacrylate, n-hexyl methacrylate, and cyclohexyl methacrylate.

The vinyl compound used in the thickening particles [E] refers to a compound having a polymerizable vinyl structure. Examples thereof include styrene, α-methyl styrene, divinyl benzene, and a compound in which these aromatic rings are substituted with various functional groups such as an alkyl group and a halogen atom.

The thickening particle [E] may be a polymer including one or two or more monomer units of the methacrylic acid ester compound, the acrylic acid ester compound, and the vinyl compound. Further, it may be a resin obtained by mixing two or more kinds of resins having different structures. Further, it may be a composite resin in which:

(i) a polymer of at least one of the acrylic acid ester compound, the methacrylic acid ester compound, and a diene compound; and (ii) a polymer of the acrylic acid ester compound or the methacrylic acid ester compound and a radically polymerizable unsaturated carboxylic acid, are ionically crosslinked by addition of (iii) a metal ion.

The thickening particle [E] is preferably a polymer including one or two or more monomer units selected from the group consisting of the methacrylic acid ester compound, the acrylic acid ester compound, and the vinyl compound, and is more preferably an alkyl methacrylate polymer.

The thickening particle [E] preferably has an average polymerization degree of from 4,000 to 40,000.

As the thickening particle [E], it is also preferable to use a commercially available product made from an alkyl methacrylate polymer having no core-shell structure, such as ZEFIAC F-325 or ZEFIAC F-320 (both manufactured by Aica Kogyo Co., Ltd.). Note that the alkyl methacrylate polymer having a core-shell structure is not preferable because this polymer hardly swells in a thermosetting resin composition due to its shell structure and thus has the low effect of increasing the viscosity.

The particle diameter and the like of the thickening particles [E] are not particularly limited. However, the average particle diameter thereof is preferably from 0.3 to 10 µm, more preferably from 0.5 to 8 µm. The content of the thickening particles [E] to be blended is preferably from 1 to 30 parts by mass, more preferably from 1 to 15 parts by mass, further more preferably from 2 to 12 parts by mass, particularly preferably from 3 to 10 parts by mass, with respect to 100 parts by mass of the epoxy resin [A].

The thickening particle [E] dispersed in the epoxy resin composition swells in the epoxy resin composition by heating. The swelling of the thickening particles [E] proceeds with the temperature and time, and the viscosity of the epoxy resin composition rapidly increases with the swelling of the thickening particle [E].

The viscosity of the epoxy resin composition is low before the swelling of the thickening particle [E], thus impregnation of the fiber-reinforced substrate layer with the epoxy resin composition is excellent. When the thickening particle [E] swells to increase the viscosity of the epoxy resin composition in the fiber-reinforced substrate layer, the resin flow during molding is reduced. As a result, both the impregnation with the resin and the reduction of the resin flow can be achieved at a high level.

The thickening initiation temperature (T1) of the epoxy resin composition in which the thickening particle [E] is blended is preferably from 80 to 110° C., more preferably from 85 to 110° C. The thickening completion temperature (T2) is preferably from 85 to 130° C., more preferably from 90 to 130° C.

Further, a difference of the thickening completion temperature (T2) and the thickening initiation temperature (T1) represented by T2−T1 is preferably from 5 to 20° C., more preferably from 7 to 20° C. When T2−T1 is less than 5° C., the viscosity of the resin composition with which the prepreg is impregnated rapidly increases at the time of molding. As a result, the viscosity of the resin composition with which the prepreg is impregnated becomes too high, so that a defect such as a void is formed inside the obtained CFRP and a performance defect is likely to occur. When T2−T1 is more than 20° C., the viscosity of the resin composition with which the prepreg is impregnated is not stabilized at the time of molding. As a result, the resin composition is rapidly fluidized and thus an appearance defect such as resin starving or fiber meandering and a performance defect are likely to occur in the obtained CFRP.

The curing initiation temperature (T3) is preferably from 90 to 130° C., more preferably from 90 to 120° C. Further, a difference of the curing initiation temperature (T3) and the thickening initiation temperature (T1) represented by T3−T1 is preferably from 5 to 80° C., more preferably from 5 to 50° C., further more preferably from 5 to 30° C.

Further, when T3−T1 is less than 5° C., at the time of molding, the curing of the epoxy resin is initiated before the completion of the thickening of the resin by the thickening particle [E], which makes it difficult to control the flow of the resin. Thus, an appearance defect such as resin starving or fiber meandering and a performance defect are likely to occur in the obtained CFRP. When T3−T1 is more than 80° C., curing the resin takes time and productivity at the time of CFRP molding decreases.

In the present invention, in the mixture of the epoxy resin [A] and the thickening particles [E], when the temperature is increased at a temperature raising rate of 2° C./min, a viscosity (η2) of the mixture at the thickening completion temperature (T2) preferably satisfies a relation of the following Formula (2).

$$5 \text{ Pa·s} \leq \eta 2 \leq 300 \text{ Pa·s} \qquad \text{Formula (2)}$$

When η2 is less than 5 Pa·s, the viscosity of the resin composition with which the prepreg is impregnated is not stabilized at the time of molding. As a result, the resin composition is rapidly fluidized and thus an appearance defect such as resin starving or fiber meandering and a performance defect are likely to occur in the obtained CFRP. When η2 is more than 300 Pa·s, the viscosity of the resin composition with which the prepreg is impregnated becomes too high at the time of molding. Therefore, a defect such as a void is easily formed inside the obtained CFRP. η2 is more preferably from 10 to 250 Pa·s, particularly preferably from 25 to 200 Pa·s.

Blending the thickening particle [E] in the epoxy resin composition can form the temperature zone in which the viscosity of the epoxy resin composition becomes substantially constant. The viscosity in this temperature zone is suitable for melding the prepreg. That is, the viscosity suitable for molding is maintained in a wide temperature range. Thus, the prepreg of the present invention in which the thickening particle [E] is blended can be used to produce the CFRP with stable quality without precisely controlling the temperature condition and the pressure condition during molding.

The cured product obtained by heat curing the epoxy resin composition of the present invention at 180° C. for 10 minutes has the glass transition temperature of preferably 160° C. or higher, and more preferably 170° C. or higher. When the glass transition temperature is 160° C. or higher, even if the CFRP product is used under the condition where heat is applied, for example, in the coating process, the product is hardly deformed, thus this case is preferable.

The epoxy resin composition of the present invention including the epoxy resin [A], the aromatic amine [B], dicyandiamide [C], and the thickening particle [E] has the viscosity at 50° C. of preferably from 50 to 1000 Pa·s, more preferably from 70 to 700 Pa·s, particularly preferably from 80 to 500 Pa·s. When the prepreg is produced by using the resin composition of less than 50 Pa·s, handling properties of the prepreg is reduced due to stickiness of the resin composition. When the viscosity is more than 1000 Pa·s, the impregnation of the fiber-reinforced substrate layer with the resin composition may become insufficient.

In addition, the epoxy resin composition including the thermoplastic resin [D] and the epoxy resin [A] in which at least a part of the thermoplastic resin [D] is dissolved, has the viscosity at 50° C. of preferably from 50 to 1000 Pa·s, more preferably from 70 to 700 Pa·s, particularly preferably from 80 to 500 Pa·s. When the prepreg is produced by using the resin composition of less than 50 Pa·s, handling properties of the prepreg is reduced due to stickiness of the resin composition. When the viscosity is more than 1000 Pa·s, the impregnation of the fiber-reinforced substrate layer with the resin composition likely becomes insufficient.

(2-6) Second Curing Agent

Further, it is also preferable to use the epoxy resin composition that includes a second curing agent undergoing a curing reacting with the epoxy resin at a temperature of 40° C. or lower. Such an epoxy resin composition is used to impregnate the fiber-reinforced substrate composed of the carbon fiber, and then the impregnated product is thickened at a temperature of 40° C. or lower, so that the prepreg homogeneously impregnated with the resin is easily obtained. As the second curing agent, an amine compound (second amine compound) is preferably used. The amount of the second amine compound is preferably from 0.1 to 0.4 equivalent in terms of active hydrogen equivalent with respect to the total amount of the epoxy groups.

The second curing agent can be used without any particular limitation as long as it is a compound causing a curing reacting with the epoxy resin composition at a temperature of 40° C. or lower. However, an amine compound is preferably used. In the present invention, the second amine compound is preferably a compound which is liquid at 25° C. Examples thereof include various isomers of an aliphatic amine-, an alicyclic amine-, and an aromatic amine-based curing agent.

Specific examples of the aliphatic amine include an alkylenediamine having 2 to 6 carbon atoms (ethylenediamine, propylenediamine, tetramethylenediamine, pentamethylenediamine, hexamethylenediamine, or the like), a polyalkylene (having 2 to 6 carbon atoms) polyamine (diethylenetriamine, iminobispropylamine, bis(hexamethylene) triamine, triethylenetetramine, tetraethylenepentamine, pentaethylenehexamine, or the like), an alkyl or hydroxyalkyl substitution product thereof (dialkylaminopropylamine, trimethylhexamethylenediamine, aminoethylethanolamine, methyliminobispropylamine, or the like), an alicyclic or heteroring-containing aliphatic polyamine such as 3,9-bis (3-aminopropyl)-2,4,8,10-tetraoxaspiro[5.5]undecane, xylylenediamine, or tetrachloro-p-xylylenediamine.

Examples of the alicyclic amine include 1,3-diaminocyclohexane, isophoronediamine, menthenediamine, 4,4'-methylenedicyclohexanediamine (hydrogenated methylenedianiline), and bis(4-amino-3-methyldicyclohexyl)methane.

Examples of the aromatic amine include diaminodiphenylmethane, m-phenylenediamine, diaminodiphenyl sulfone, diethyltoluenediamine, trimethylene bis(4-aminobenzoate), and polytetramethyleneoxide-di-p-aminobenzoate.

Examples of the heterocyclic amine include piperazine, 1-aminoethylpiperazine, 1,4-diaminoethylpiperazine, 3-aminopyrrolidine, 2-(2-aminoethyl)pyrrolidine, 4,4'-bipiperazine, 4,4'-ethylenedipiperidine, 4,4'-trimethylenedipiperidine, 4-(aminomethyl)piperidine, and 3-(4-aminobutyl) piperidine.

As the second amine compound, the alicyclic diamine and/or the aromatic diamine having the viscosity at 25° C. of from 10 to 500 mPa·s is preferably used, and the viscosity is more preferably from 20 to 400 mPa·s. Using the second amine compound having such viscosity can improve the impregnation of the reinforcing fiber substrate.

When the amine (second amine compound) is used as the second curing agent, the amount of the second amine compound included in the epoxy resin composition is preferably from 0.1 to 0.4 equivalent in terms of active hydrogen with respect to the total amount of the epoxy groups blended in the epoxy resin composition. The amount of the second amine compound is more preferably from 0.15 to 0.35 equivalent, further more preferably from 0.2 to 0.35 equivalent. Blending the second amine compound in an amount within this range can appropriately thicken the epoxy resin composition. When the amount is less than 0.1 equivalent, the epoxy resin composition is not sufficiently thickened in the prepreg. When the amount is more than 0.4 equivalent, the curing reaction with the epoxy resin composition may excessively proceed, making it difficult to perform press molding.

(2-7) Other Additives

The epoxy resin composition of the present invention may be blended with a flame retardant, an inorganic filler, and an internal mold release agent.

As the flame retardant, a phosphorus-based flame retardant is exemplified. The phosphorus-based flame retardant is not particularly limited as long as it includes a phosphorus atom in the molecule, and examples thereof include an organic phosphorus compound such as a phosphate ester, a condensed phosphate ester, a phosphazene compound, or phosphinate, and an organic phosphorus compound or red phosphorus such as a polyphosphate.

Examples of the inorganic filler include aluminum borate, calcium carbonate, silicon carbonate, silicon nitride, potassium titanate, basic magnesium sulfate, zinc oxide, graphite, calcium sulfate, magnesium borate, magnesium oxide, a silicate mineral, and a metal hydroxide. The silicate mineral and the metal hydroxide are particularly preferably used. As a commercially available product of the silicate mineral, THIXOTROPIC AGENT DT 5039 (manufactured by Huntsman-Japan KK) can be mentioned. Examples of the metal hydroxide include aluminum hydroxide, magnesium hydroxide, or the like. Of these, in a case of imparting flame retardant properties, aluminum hydroxide is preferable from the standpoints of the thermal decomposition temperature and the endothermic amount at the time of decomposition. As the metal hydroxide, a commercially available product may be used, or a product synthesized by a known production method may be used. Examples of the commercially available product of aluminum hydroxide include C-303, C-301, C-300GT, C-305, C-3250, or CM-450 manufactured by Sumitomo Chemical Company, or HIGILITE H-42 or H-43 manufactured by SHOWA DENKO K.K.

Further, examples of the commercially available product of magnesium hydroxide include MAGSTAR #5, #4, or #2, ECOMAG PZ-1, or Z-10 manufactured by Tateho Chemical Industries Co., Ltd.

The content ratio of the inorganic filler to be blended in the epoxy resin composition is preferably from 5 to 30% by mass, more preferably from 7 to 25% by mass. When the content ratio of the inorganic filler is less than 5% by mass, the flame retardant effect may not be sufficiently obtained. When the content ratio of the inorganic filler is more than 30% by mass, dynamic characteristics, in particular, rigidity and the Charpy impact value may decrease.

Examples of the internal mold release agent include a metal soap, plant wax such as polyethylene wax or carnauba wax, a fatty acid ester-based release agent, silicone oil, animal wax, and a fluorine-based nonionic surfactant. The blending amount of these internal mold release agents is preferably from 0.1 to 5 parts by mass, more preferably 0.2 to 2 parts by mass, with respect to 100 parts by mass of the epoxy resin. Within this range, the releasing effect from a mold is suitably exhibited.

Examples of a commercially available product of the internal mold release agent include MOLD WIZ (registered trademark) INT 1846 (manufactured by AXEL PLASTICS RESEARCH LABORATORIES Inc.), Licowax S, Licowax P, Licowax OP, Licowax PE 190, Licowax PED (manufactured by Clariant Japan K.K.), and stearyl stearate (SL-900 A; manufactured by Riken Vitamin Co., Ltd.).

(2-8) Production Method of Epoxy Resin Composition

The epoxy resin composition can be produced by mixing the epoxy resin [A], the aromatic amine [B], and dicyandiamide [C]. These may be mixed in any order.

In a case where the thermoplastic resin [D] is mixed for the purpose of improving impact resistance, the epoxy resin composition can be produced by mixing the epoxy resin [A], the aromatic amine [B], dicyandiamide [C], and the thermoplastic resin [D]. These may be mixed in any order.

In a case where the thickening particle [E] is mixed for the purpose of improving moldability, the epoxy resin composition can be produced by mixing the epoxy resin [A], the aromatic amine [B], dicyandiamide [C], and the thickening particle [E]. These may be mixed in any order.

The method for producing the epoxy resin composition is not particularly limited, and any conventionally known method may be used. As the mixing temperature, a range of from 40 to 120° C. can be exemplified. When the mixing temperature is higher than 120° C., in some cases, the partial progress of the curing reaction causes a reduction in the impregnation of the fiber reinforced substrate layer and a reduction in storage stability of the obtained resin composition and the prepreg produced by using the resin composition. When the mixing temperature is lower than 40° C., in some cases, the excessively high viscosity of the resin composition makes it substantially difficult to perform mixing. The mixing temperature is preferably from 50 to 100° C., more preferably from 50 to 90° C.

As a mixing machine, a conventionally known mixing machine can be used. Specific examples thereof include a roll mill, a planetary mixer, a kneader, an extruder, a Banbury mixer, a mixing container equipped with a stirring blade, and a horizontal mixing tank. The mixing of each component can be performed in the atmosphere or in an inert gas atmosphere. When the mixing is performed in the atmosphere, the temperature and humidity of the atmosphere are preferably controlled. Although not particularly limited, for example, it is preferable that the mixing is performed in the atmosphere in which the temperature is controlled at a constant temperature of 30° C. or lower, or in the low humidity atmosphere having a relative humidity of 50% RH or lower.

(3) Method for Producing the Prepreg

The method for producing the prepreg of the present invention is not particularly limited, and any conventionally known method can be adopted. Specifically, a hot melt method and a solvent method can be suitably adopted.

The hot melt method is a method in which a resin composition film is formed by applying a resin composition to a release paper in the form of a thin film, and the resin composition film is laminated on the fiber-reinforced substrate and heated under pressure to impregnate the fiber-reinforced substrate layer with the resin composition.

A method of forming the resin composition into the resin composition film is not particularly limited, and any conventionally known method can be used. Specifically, the resin composition film can be obtained by casting the resin composition on a support such as a release paper or a film using a die extruder, an applicator, a reverse roll coater, a comma coater, or the like. The resin temperature at the time of producing the film is appropriately determined in accordance with the composition and the viscosity of the resin composition. Specifically, the same temperature condition as the mixing temperature in the above method for producing the epoxy resin composition are suitably used. Impregnation of the fiber-reinforced substrate layer with the epoxy resin composition may be performed once or multiple times.

The solvent method is a method in which the epoxy resin composition is varnished using a suitable solvent, and the fiber-reinforced substrate layer is impregnated with this varnish.

The prepreg of the present invention can be suitably produced by the hot-melt method not using a solvent among these conventional methods.

When the fiber-reinforced substrate layer is impregnated with the epoxy resin composition film by the hot melt method, the impregnation temperature is preferably in a range of from 50 to 120° C. When the impregnation temperature is lower than 50° C., in some cases, the fiber-reinforced substrate layer is not sufficiently impregnated with the epoxy resin due to the high viscosity of the epoxy resin composition. When the impregnation temperature is higher than 120° C., in some cases, the curing reaction of the epoxy resin proceeds, thereby causing a reduction in the storage stability and the draping properties of the obtained prepreg. The impregnation temperature is more preferably from 60 to 110° C., particularly preferably from 70 to 100° C.

When the fiber-reinforced substrate layer is impregnated with the epoxy resin composition film by the hot melt method, the impregnation pressure is appropriately determined in consideration of, for example, the viscosity and the resin flow of the resin composition.

(4) Carbon Fiber-Reinforced Composite Material (CFRP)

The CFRP of the present invention can be obtained by curing the prepreg of the present invention by heating and pressurizing.

The CFRP of the present invention is characterized by having low water absorption. The term "water absorption" described herein refers to a mass increase ratio after storing for 24 hours under conditions of 121° C. and 100% RH. The water absorption is preferably less than 1.8% by mass, more preferably 1.5% by mass or less, further more preferably 1.3% by mass or less, particularly preferably 1.2% by mass or less. When the water absorption is too high, the 0° compressive strength reduction ratio described below tends to increase.

The 0° compressive strength reduction ratio can be obtained from the following Formula (3) using the 0° compressive strength (a) measured under a dry condition at 25° C. and the 0° compressive strength (b) measured in an environment at 70° C. after storing in water at 70° C. for 2 weeks.

$$(a-b)/a \times 100 \qquad \text{Formula (3)}$$

That is, as the 0° compressive strength reduction ratio becomes smaller, the water absorption resistance can be determined to be higher.

The 0° compressive strength reduction ratio is preferably 30% or less, more preferably 28% or less, further more preferably 26% or less.

As the method for producing the CFRP using the prepreg of the present invention, autoclave molding, press molding, inner pressure molding, vacuum assist-pressure molding, and the like can be mentioned.

(4-1) Autoclave Molding Method

As the method for producing CFRP of the present invention, the autoclave molding method is preferably used. The autoclave molding method is a molding method in which a prepreg and a film bag are sequentially placed on a lower die of a mold, the prepreg is sealed between the lower die and the film bag, and the prepreg is heated and pressed by an autoclave molding apparatus while the space formed by the lower die and the film bag is vacuumed. It is preferable that heating and pressing are performed under molding conditions of a temperature raising rate of from 1 to 50° C./min at from 0.2 to 0.7 MPa and from 130 to 180° C. for from 10 to 30 minutes.

(4-2) Press Molding Method

As the method for producing the CFRP of the present invention, the press melding is preferable from the standpoints of taking advantage of features of the epoxy resin composition constituting the prepreg, achieving high productivity, and obtaining the high-quality CFRP. The production of CFRP by the press molding method is performed by heating and pressing the prepreg of the present invention or a preform formed by laminating the prepreg of the present invention by using a mold. It is preferable that the mold is heated to the curing temperature in advance.

The temperature of the mold during press molding is preferably from 130 to 180° C. When the molding temperature is 130° C. or higher, a curing reaction can be sufficiently caused, and the CFRP can be obtained with high productivity. Further, when the molding temperature is 180° C. or lower, the resin viscosity is not excessively reduced, and thus excessive flow of the resin in the mold can be reduced. As a result, it becomes possible to reduce the outflow of the resin from the mold and the meandering of the fiber, so that the CFRP with high quality can be obtained.

The pressure during molding is from 0.2 to 10 MPa. When the pressure is 0.2 MPa or higher, the proper flow of the resin can be obtained, thus the occurrence of an appearance defect and a void can be prevented. Further, the prepreg sufficiently adheres to the mold, allowing the production of the CFRP having an excellent appearance. When the pressure is 10 MPa or lower, there is no excessive flow of the resin, thus an appearance defect of the obtained CFRP hardly occurs. Further, no excessive load is applied to the mold, thus the deformation or the like of the mold hardly occurs.

(4-3) Inner Pressure Molding Method

As the method for producing the CFRP of the present invention, the inner pressure molding method is also preferably used. The inner pressure molding method is a molding method performed as follows. The prepreg is disposed outside a bag-shaped inner pressure bag to obtain a prepreg laminate having the inner pressure bag inside thereof, the prepreg laminate is disposed in a mold, followed by clamping of the mold, and the inner pressure bag is expanded inside the mold, thereby causing the prepreg to be inscribed in the inner wall of the mold. The prepreg is heat cured in this state.

The method for producing the CFRP by the inner pressure molding method will be described. First, the prepreg of the present invention is disposed in each of an upper die and a lower die of a mold. Next, the inner pressure bag is placed between the upper die and the lower die in each of which the prepreg is disposed, and the upper die and the lower die are clamped. In this manner, a prepreg laminate having the inner pressure bag inside thereof is obtained. Subsequently, the prepreg in the mold is inscribed in the inner wall of the mold by expanding the inner pressure bag inside the mold, and, in this state, the prepreg is heat cured by heating the mold. After an elapse of a predetermined time, a molded product is taken out of the mold and the inner pressure bag is removed to obtain the CFRP.

The mold is preferably preheated to the curing temperature before the prepreg is disposed from the standpoint of productivity.

A material of the inner pressure bag is preferably a material having flexibility and excellent heat resistance, such as nylon or silicone rubber.

The temperature in the mold during inner pressure molding is preferably from 130 to 180° C. When the molding temperature is 130° C. or higher, a curing reaction can be sufficiently caused, and the CFRP can be obtained with high productivity. Further, when the molding temperature is 180° C. or lower, the resin viscosity is not excessively reduced, and thus excessive flow of the resin in the mold can be reduced. As a result, it becomes possible to reduce the outflow of the resin from the mold and the meandering of the fiber, and the CFRP with high quality can be obtained.

The pressure during molding is from 0.2 to 2 MPa. When the pressure is 0.2 MPa or higher, the proper flow of the resin can be obtained, thus the occurrence of an appearance defect and a void can be prevented. Further, the prepreg sufficiently adheres to the mold, allowing the obtaining of the CFRP having an excellent appearance. When the pressure is 2 MPa or less, the flexible inner pressure bag such as nylon or silicone rubber is hardly damaged.

(4-4) Vacuum Assist-Pressure Molding Method

As the method for producing the CFRP of the present invention, the vacuum assist-pressure molding method is also preferably used. The vacuum assist-pressure molding method is a molding method performed as follows. The prepreg and a film bag are sequentially disposed in a lower die of a mold and the prepreg is sealed between the lower die and the film bag. The inside of a cavity of the mold formed by clamping an upper die and the lower die is pressurized with the air, while a space formed by the lower die and the film bag is vacuumed, to perform heat curing of the prepreg.

The method for producing the CFRP by the vacuum assist pressure molding method will be described. First, the prepreg of the present invention is disposed in a lower die of a mold. Next, a film bag is laminated on the prepreg and the prepreg is sealed between the lower die and the film bag. Subsequently, a space formed by the lower die and the film bag is vacuumed to cause the prepreg to be inscribed in the lower die. Further, the inside of a cavity of the mold formed by clamping the mold is pressurized with the air to bring the prepreg into further closer contact with the lower die. In this state, the prepreg is heat cured by heating. After an elapse of a predetermined time, a molded product is taken out of the mold and the film bag is removed to obtain the CFRP.

The lower die preferably has a heating mechanism that enables rapid heating from the standpoint of productivity.

A material of the film bag is preferably a material having flexibility and excellent heat resistance, such as nylon or silicone rubber.

It is preferable that the prepreg and the film bag are laminated at the mold temperature of from 20 to 50° C., brought into a vacuum state, and then heated to from 130 to 180° C. at a temperature raising rate of from 2 to 100° C./min. When the molding temperature is 130° C. or higher, a curing reaction can be sufficiently caused, and the CFRP can be obtained with high productivity. Further, when the molding temperature is 180° C. or lower, the resin viscosity is not excessively reduced, and thus excessive flow of the resin in the mold can be reduced, and it becomes possible to reduce the outflow of the resin from the mold and the meandering of the fiber, so that the CFRP with high quality can be obtained.

The pressure during molding is from 0.2 to 2 MPa. When the pressure is 0.2 MPa or higher, the proper flow of the resin can be obtained, thus the occurrence of an appearance defect and a void can be prevented. Further, the prepreg sufficiently adheres to the mold, allowing the obtaining of the CFRP having an excellent appearance. When the pressure is 2 MPa or less, the flexible film bag such as nylon or silicone rubber is hardly damaged.

The curing time in the producing method of the present invention is from 10 to 30 minutes, which is a shorter than that in the conventional method. That is, the high-quality CFRP can be produced with high productivity.

EXAMPLES

Hereinafter, the present invention will be described in more detail with reference to Examples, but the present invention is not limited to these Examples. The components and test methods used in the present Examples and Comparative Examples are explained below.
(Carbon Fiber)
"TENAX (registered trademark)" STS40-24K: (carbon fiber strand, tensile strength of 4.2 GPa, elastic modulus of 240 GPa, manufactured by Toho Tenax)
(Epoxy Resin)
"jER (registered trademark)" 154: (semisolid phenol novolac epoxy resin, manufactured by Mitsubishi Chemical Corp.)
"jER (registered trademark)" 828: (liquid bisphenol A epoxy resin, manufactured by Mitsubishi Chemical Corp.)
"jER (registered trademark)" 834: (liquid bisphenol A epoxy resin, manufactured by Mitsubishi Chemical Corp.)
"jER (registered trademark)" 604: (tetraglycidyl diaminodiphenylmethane epoxy resin, manufactured by Mitsubishi Chemical Corp.)
"jER (registered trademark)" 630: (p-aminophenol epoxy resin, manufactured by Mitsubishi Chemical Corp.)
(Thickening Particle)
"ZEFIAC (registered trademark)" F320: (alkyl methacrylate polymer), average polymerization degree of 30,000, manufactured by AIKA Kogyo Co., Ltd.)
(Curing Agent, Curing Accelerator)
Dicy7: (dicyandiamide, manufactured by Mitsubishi Chemical Corp.)
"OMICURE (registered trademark)" 24: (2,4'-toluene bis (3,3-dimethyl urea), manufactured by PTI Japan Ltd.)
DCMU-99: (3,4-dichlorophenyl-1,1-dimethylurea, manufactured by Hodogaya Chemical Co., Ltd.)
2E4MZ: 2-ethyl-4-methylimidazole
3,3'-DDS: 3.3'-diaminodiphenyl sulfone (aromatic amine-based curing agent manufactured by SEIKA Corp.)
4,4'-DDS: 4.4'-diaminodiphenyl sulfone (aromatic amine-based curing agent manufactured by SEIKA Corp.)
(Aromatic Amine)
CUREHARD-MED: having structure of above Chemical Formula (2) (manufactured by KUMIAI CHEMICAL INDUSTRY Co., Ltd.)
M-DEA: compound having structure of above Chemical Formula (3) (manufactured by Lonza)
M-MIPA: compound having structure of above Chemical Formula (4) (manufactured by Lonza)
M-CDEA: compound having structure of above Chemical Formula (5) (manufactured by Lonza)
(Thermoplastic Resin)
Virantage VW-10700RFP (trade name): manufactured by Solvay Specialty Polymers, polyethersulfone having average particle diameter of 20 μm, weight average molecular weight (Mw) of 22,000
PES 5003P: polyethersulfone (thermoplastic resin soluble in epoxy resin) (hereinafter, PES), manufactured by Sumitomo Chemical Company, average particle diameter of 20 μm
PA12: (polyamide 12, average particle diameter of 20 μm, manufactured by Daicel-Evonik Ltd.)
PA1010: (polyamide 1010, average particle diameter of 20 μm, manufactured by Daicel-Evonik Ltd.)
PA11: (polyamide 11, average particle diameter of 20 μm, manufactured by Arkema)
Grilamid TR 55: (amorphous polyamide, average particle diameter of 20 μm, manufactured by EMS-CHEMIE (Japan) Ltd.)
(Second Curing Agent)
"IPDA": (isophoronediamine, manufactured by PTI Japan Ltd.)
"PACM: (bis(para-aminocyclohexyl)methane, manufactured by PTI Japan Ltd.)
(Additive)
KaneAce (registered trademark) "MX-416": liquid masterbatch prepared by dispersing 25 wt % core-shell rubber particles in tetraglycidyl-4,4'-diaminodiphenylmethane (glycidyl amine type epoxy resin) (manufactured by KANEKA Corp.)

Examples 1 to 27, Comparative Examples 1 to 4

(1) Formulation of Epoxy Resin Composition
Predetermined amounts of the epoxy resin [A] and the thermoplastic resin [D] to be dissolved in this epoxy resin [A] were added in a kneader in a ratio described in Tables 1 to 4, and the temperature was increased to 150° C. while kneading to completely dissolve the solid component. Subsequently, the temperature was lowered to 60° C. while kneading, and the thickening particle [E], dicyandiamide [C], the thermoplastic resin [D], and the like were added to the mixture in a ratio described in Tables 1 to 4 and uniformly dispersed by stirring for 30 minutes, thereby obtaining an epoxy resin composition.
(2) Production of Prepreg
(2-1) Production of Unidirectional Prepreg
The unidirectional prepreg was produced as follows. The epoxy resin composition obtained in the above was applied on a release paper using a reverse roll coater to produce a resin film having a basis weight of 50 g/m². Next, carbon fibers were unidirectionally arranged so as to have a fiber mass per unit area of 190 g/m² to produce a fiber-reinforced substrate layer in a sheet shape. The resin films described above were laminated on both sides of this fiber-reinforced substrate layer and subjected to heating and pressurizing under conditions of a temperature of 100° C. and a pressure of 0.2 MPa to produce a unidirectional prepreg having a carbon fiber content ratio of 65% by mass.
(3) Measurement of Gel Time of Epoxy Resin Composition
The epoxy resin composition in an amount of 3 g was prepared as a sample and the gel time was measured at a temperature of 150° C. using CURELASTOMETER IIF-120 (manufactured by JSR Trading Co., Ltd.) for tracking the curing of the resin.
(4) Measurement of Glass Transition Temperature
A laminate obtained by laminating ten sheets of the unidirectional prepregs described above in a direction of [0°] was put inside a bag, and this was heated at a ratio of 2°

C./min in an autoclave and maintained at 150° C. for 30 minutes for curing to produce a molded plate (carbon fiber-reinforced composite material). During this process, the inside of the autoclave was pressurized to 0.7 MPa and the inside of the bag was kept vacuum.

The glass transition temperature of the carbon fiber-reinforced composite material was measured in accordance with SACMA 18R-94 method. The molded plate described above was processed to a test piece having a length (fiber direction) of 55 mm and a width of 12 mm, and the storage elastic modulus G' of the test piece from 30° C. to the rubber elastic region was measured using a rheometer ARES-RDA manufactured by Rheometric Scientific under conditions of a measurement frequency of 1 Hz, a temperature raising rate of 5° C./min, and a strain of 0.01% with the distance between chucks set to 45 mm. Log G' was plotted over temperature, and the temperature determined from the intersection point of the approximate straight line of the flat region of log G' and the approximate straight line of the region where G' was transited was recorded as the glass transition temperature (Tg).

(5) Measurement of Water Absorption

A laminate obtained by laminating ten sheets of the unidirectional prepregs described above in a direction of [0°] was put inside a bag, and this was heated at a ratio of 2° C./min in an autoclave and maintained at 150° C. for 30 minutes for curing to produce a molded plate (carbon fiber-reinforced composite material). During this process, the inside of the autoclave was pressurized to 0.7 MPa and the inside of the bag was kept vacuum.

The molded plate described above was processed to a test piece of 50 mm×50 mm and subjected to a moist heat treatment for 24 hours using a pressure cooker PC-422R8 (manufactured by HIRAYAMA Manufacturing Corp.) under conditions of 121° C., 100% RH, and 2 atm. The water absorption was evaluated by comparing the mass before and after the treatment.

(6) Measurement of Compressive Strength

A laminate obtained by laminating five sheets of the unidirectional prepregs described above in a direction of [0°] was put inside a bag, and this was heated at a ratio of 2° C./min in an autoclave and maintained at 150° C. for 30 minutes for curing to produce a molded plate (carbon fiber-reinforced composite material). During this process, the inside of the autoclave was pressurized to 0.7 MPa and the inside of the bag was kept vacuum.

The compressive strength of the carbon fiber-reinforced composite material was measured with a test rate of 1.0 mm/min in accordance with SACMA 1R-94. The number of samples was set to 5 and their average value was used.

(7) Evaluation of Press Moldability

The unidirectional prepreg described above was cut into a size of 100 mm×100 mm, and 10 sheets of the cut pieces were laminated in a direction of [0°/90°/0°/90°/0°/0°/90°/0°/90°/0°] to obtain a laminate. An upper die and a lower die of a mold were heated to 150° C. in advance, the prepreg laminate described above was disposed on the lower die, and the upper die was immediately lowered to close the mold. After the mold was kept at 0.1 MPa for 30 seconds, a pressure of 2 MPa was applied to cure the prepreg laminate by heating and pressurizing for 5 minutes. Next, a molded product was taken out from the mold to obtain an FRP. This FRP was measured using an ultrasonic flaw detector (SDS-3600: manufactured by Krautkramer Japan Co., Ltd.) by a double transmission method at a frequency of 5 Hz and an amplification degree of 25 dB. An inner defect of the FRP was evaluated by calculating a ratio of a threshold 50% or less with respect to the measured area.

Determination of Inner Defect

○: very good: ratio of threshold 50% or less is less than 1.0%.

Δ: good: ratio of threshold 50% or less is 1.0% or more and less than 3.0%.

×: poor: ratio of threshold 50% or less is 3.0% or more.

Examples 28 and 29

(8) Formulation of Epoxy Resin Composition

In a ratio described in Table 5, the epoxy resin [A], the aromatic amine [B], dicyandiamide [C], the thickening particle [E], the urea-based curing accelerator, the core-shell rubber, and the like were measured in a ratio described in Table 5 and kneaded with a three roll mill. To this mixed resin, the second curing agent having the curing temperature with the epoxy resin of 40° C. or lower was added in a ration described in Table 5, thereby obtaining an epoxy resin mixture.

(9) Production of Unidirectional Prepreg

The unidirectional prepreg was produced as follows. The epoxy resin composition obtained in the above was applied on a release paper using a reverse roll coater to produce a resin film having a basis weight of 50 g/m². Next, carbon fibers were unidirectionally arranged so as to have a fiber mass per unit area of 190 g/m² to produce a fiber-reinforced substrate layer in a sheet shape. The resin films described above were laminated on both sides of this fiber-reinforced substrate layer and subjected to heating and pressurizing under conditions of a temperature of 80° C. and a pressure of 0.2 MPa. After that, the heat treatment was performed at 40° C. for 48 hours to produce a unidirectional prepreg having a carbon fiber content ratio of 65% by mass.

TABLE 1

|  |  | Example 1 | Example 2 | Example 3 | Example 4 | Comparative Example 1 | Comparative Example 2 |
|---|---|---|---|---|---|---|---|
| Epoxy resin [A] | jER 828 | 25 | 30 | 20 | 50 | 25 | 25 |
|  | jER 834 |  |  |  |  |  |  |
|  | jER 604 | 75 | 70 | 80 | 50 | 75 | 75 |
|  | jER 630 |  |  |  |  |  |  |
|  | jER 154 |  |  |  |  |  |  |
| Thermoplastic resin to be dissolved in the epoxy resin [D] | Virantage 10700 | 15 | 15 | 15 | 15 | 15 | 15 |
|  | PES 5003P |  |  |  |  |  |  |
| Thickening particle [E] | ZEFIAC F320 | 5 | 5 | 5 | 5 | 5 | 5 |
| Thermoplastic resin particle [D] | PA12 | 20 | 20 | 20 | 20 | 20 | 20 |
|  | PA1010 |  |  |  |  |  |  |
|  | PA11 |  |  |  |  |  |  |
|  | TR55 |  |  |  |  |  |  |

TABLE 1-continued

|  |  | Example 1 | Example 2 | Example 3 | Example 4 | Comparative Example 1 | Comparative Example 2 |
|---|---|---|---|---|---|---|---|
| Dicyandiamide [C] | DICY | 3 | 3 | 3 | 3 | 3 |  |
| Urea-based curing accelerator | OMICURE 24 | 4 | 4 | 4 | 4 | 4 |  |
|  | DCMU-99 |  |  |  |  |  |  |
|  | 2E4MZ |  |  |  |  |  |  |
| Aromatic amine [B] | CUREHARD-MED | 10 | 10 | 10 | 10 |  | 10 |
|  | M-DEA |  |  |  |  |  |  |
|  | M-MIPA |  |  |  |  |  |  |
|  | M-CDEA |  |  |  |  |  |  |
| Other curing agents | 3,3'-DDS |  |  |  |  |  |  |
|  | 4,4'-DDS |  |  |  |  |  |  |
| Gel time (150° C.) | Minutes | 3.0 | 2.8 | 2.8 | 3.0 | 3.0 | 40 |
| Glass transition temperature | ° C. | 189 | 186 | 191 | 170 | 197 | 180 |
| Water absorption [121° C., 100% RH, 24 h] | % by mass | 1.1 | 1.1 | 1.2 | 1.1 | 1.7 | 0.9 |
| 0° compressive strength [Dry, RT] | MPa | 1520 | 1520 | 1550 | 1490 | 1510 | 1500 |
| 0° compressive strength [Wet, 70° C.] | MPa | 1100 | 1180 | 1150 | 1200 | 950 | 1210 |
| Press moldability | — | ○ | ○ | ○ | ○ | ○ | ○ |
| 0° compressive strength reduction ratio | % | 27.6 | 22.4 | 25.8 | 19.5 | 37.1 | 19.3 |
| Thickening initiation temperature (T1) | ° C. | 100 | 99 | 102 | 91 | 100 | 100 |
| Thickening completion temperature (T2) | ° C. | 111 | 113 | 111 | 109 | 112 | 110 |
| Curing initiation temperature (T3) | ° C. | 119 | 118 | 118 | 117 | 118 | 117 |
| Viscosity at the time of thickening completion (η2) | Pa·s | 25 | 26 | 25 | 25 | 28 | 24 |
| Viscosity at 50° C. | Pa·s | 210 | 192 | 225 | 121 | 103 | 205 |

TABLE 2

|  |  | Example 5 | Example 6 | Example 7 | Example 8 | Example 9 | Example 10 | Example 11 | Example 12 | Example 13 |
|---|---|---|---|---|---|---|---|---|---|---|
| Epoxy resin [A] | jER 828 | 25 | 80 | 25 |  |  | 25 | 40 | 40 | 25 |
|  | jER 834 |  |  |  | 25 | 25 |  |  |  |  |
|  | jER 604 | 75 | 20 | 50 | 75 | 50 | 75 | 60 | 60 | 75 |
|  | jER 630 |  |  | 25 |  |  |  |  |  |  |
|  | jER 154 |  |  |  |  | 25 |  |  |  |  |
| Thermoplastic resin to be dissolved in the epoxy resin [D] | Virantage 10700 | 15 | 15 | 15 | 15 | 15 |  |  |  | 15 |
|  | PES 5003P |  |  |  |  |  | 10 | 10 | 10 |  |
| Thickening particle [E] | ZEFIAC F320 |  |  | 5 | 5 | 5 | 5 | 5 | 5 | 1 |
| Thermoplastic resin particle [D] | PA12 | 20 | 20 | 20 | 20 | 20 | 20 |  |  |  |
|  | PA1010 |  |  |  |  |  |  | 20 | 20 |  |
|  | PA11 |  |  |  |  |  |  |  |  | 10 |
|  | TR55 |  |  |  |  |  |  |  |  |  |
| Dicyandiamide [C] | DICY | 3 | 3 | 4 | 4 | 4 | 3 | 1 | 8 | 3 |
| Urea-based curing accelerator | OMICURE 24 | 4 | 4 | 5 | 5 | 5 | 4 | 2 | 10 | 4 |
|  | DCMU-99 |  |  |  |  |  |  |  |  |  |
|  | 2E4MZ |  |  |  |  |  |  |  |  |  |
| Aromatic amine [B] | CUREHARD-MED | 10 | 10 | 10 | 10 | 10 | 10 | 10 | 10 | 15 |
|  | M-DEA |  |  |  |  |  |  |  |  |  |
|  | M-MIPA |  |  |  |  |  |  |  |  |  |
|  | M-CDEA |  |  |  |  |  |  |  |  |  |
| Other curing agents | 3,3'-DDS |  |  |  |  |  |  |  |  |  |
|  | 4,4'-DDS |  |  |  |  |  |  |  |  |  |
| Gel time (150° C.) | Minutes | 3.0 | 2.7 | 2.5 | 3.0 | 3.2 | 3.0 | 4.5 | 2.0 | 3.1 |
| Glass transition temperature | ° C. | 188 | 150 | 192 | 188 | 192 | 190 | 172 | 179 | 189 |
| Water absorption [121° C., 100% RH, 24 h] | % by mass | 1.1 | 1.0 | 1.0 | 1.1 | 1.0 | 1.1 | 1.0 | 1.3 | 1.1 |
| 0° compressive strength [Dry, RT] | MPa | 1500 | 1440 | 1400 | 1510 | 1470 | 1510 | 1280 | 1300 | 1500 |
| 0° compressive strength [Wet, 70° C.] | MPa | 1110 | 1180 | 1110 | 1110 | 1080 | 1100 | 910 | 940 | 1080 |
| Press moldability | — | x | x | ○ | ○ | ○ | ○ | ○ | ○ | x |
| 0° compressive strength reduction ratio | % | 26.0 | 18.1 | 20.7 | 26.5 | 26.5 | 27.2 | 28.9 | 27.7 | 28.0 |
| Thickening initiation temperature (T1) | ° C. | — | — | 97 | 102 | 94 | 99 | 95 | 94 | — |
| Thickening completion temperature (T2) | ° C. | — | — | 111 | 112 | 111 | 110 | 113 | 111 | — |
| Curing initiation temperature (T3) | ° C. | 117 | 116 | 120 | 121 | 119 | 118 | 118 | 120 | 117 |
| Viscosity at the time of thickening completion (η2) | Pa·s | — | — | 62 | 85 | 65 | 70 | 48 | 54 | — |
| Viscosity at 50° C. | Pa·s | 210 | 40 | 133 | 245 | 122 | 156 | 146 | 162 | 208 |

TABLE 3

|  |  | Example 14 | Example 15 | Example 16 | Example 17 | Example 18 | Example 19 | Example 20 | Example 21 |
|---|---|---|---|---|---|---|---|---|---|
| Epoxy resin (A) | jER 823 | 25 | 25 | 30 | 30 | 30 | 30 | 40 | 40 |
|  | jER 834 |  |  |  |  |  |  |  |  |
|  | jER 604 | 75 | 75 | 70 | 70 | 70 | 70 | 60 | 60 |
|  | jER 630 |  |  |  |  |  |  |  |  |
|  | jER 154 |  |  |  |  |  |  |  |  |
| Thermoplastic resin to be dissolved in the epoxy resin [D] | Virantage 10700 | 15 | 15 | 20 | 20 | 20 | 20 | 30 | 30 |
|  | PES 5003P |  |  |  |  |  |  |  |  |
| Thickening particle [E] | ZEFIAC F320 | 5 | 25 | 5 | 5 | 5 | 5 | 6 | 6 |
| Thermoplastic resin particle [D] | PA12 |  |  | 15 |  |  |  |  |  |
|  | PA1010 |  |  |  | 15 |  |  | 10 | 10 |
|  | PA11 | 10 | 10 |  |  | 15 |  |  |  |
|  | TR55 |  |  |  |  |  | 15 |  |  |
| Dicyandiamide [C] | DICY | 3 | 3 | 2 | 2 | 2 | 2 | 3 | 3 |
| Urea-based curing accelerator | OMICURE 24 | 4 | 4 | 3 | 3 | 3 | 3 | 4 |  |
|  | DCMU-99 |  |  |  |  |  |  |  | 4 |
|  | 2E4MZ |  |  |  |  |  |  |  |  |
| Aromatic amine [B] | CUREHARD-MED | 15 | 15 | 8 | 8 | 8 | 8 | 5 | 5 |
|  | M-DEA |  |  |  |  |  |  |  |  |
|  | M-MIPA |  |  |  |  |  |  |  |  |
|  | M-CDEA |  |  |  |  |  |  |  |  |
| Other curing agents | 3,3'-DDS |  |  |  |  |  |  |  |  |
|  | 4,4'-DDS |  |  |  |  |  |  |  |  |
| Gel time (150° C.) | Minutes | 3.0 | 3.0 | 3.5 | 3.5 | 4.0 | 4.2 | 2.8 | 2.5 |
| Glass transition temperature | ° C. | 190 | 178 | 187 | 187 | 190 | 189 | 175 | 173 |
| Water absorption [121° C., 100% RH, 24 h] | % by mass | 1.1 | 1.2 | 0.9 | 0.9 | 1.1 | 1.0 | 1.0 | 1.1 |
| 0° compressive strength [Dry, RT] | MPa | 1510 | 1400 | 1500 | 1500 | 1520 | 1510 | 1480 | 1480 |
| 0° compressive strength [Wet, 70° C.] | MPa | 1080 | 990 | 1120 | 1120 | 1100 | 1090 | 1090 | 1070 |
| Press moldability | — | ○ | ○ | ○ | ○ | ○ | ○ | ○ | ○ |
| 0° compressive strength reduction ratio | % | 28.5 | 26.4 | 25.3 | 25.3 | 27.6 | 27.8 | 26.4 | 27.7 |
| Thickening initiation temperature (T1) | ° C. | 100 | 101 | 101 | 100 | 100 | 99 | 95 | 95 |
| Thickening completion temperature (T2) | ° C. | 113 | 112 | 112 | 111 | 111 | 112 | 110 | 112 |
| Curing initiation temperature (T3) | ° C. | 121 | 121 | 119 | 119 | 120 | 120 | 118 | 121 |
| Viscosity at the time of thickening completion (η2) | Pa · s | 60 | 89 | 64 | 62 | 65 | 63 | 165 | 160 |
| Viscosity at 50° C. | Pa · s | 211 | 223 | 350 | 348 | 353 | 356 | 657 | 641 |

TABLE 4

|  |  | Example 22 | Example 23 | Example 24 | Example 25 | Example 26 | Example 27 | Comparative Example 3 | Comparative Example 4 |
|---|---|---|---|---|---|---|---|---|---|
| Epoxy resin [A] | jER 828 | 40 | 30 | 30 | 30 | 25 | 25 | 30 | 30 |
|  | jER 834 |  |  |  |  |  |  |  |  |
|  | jER 604 | 60 | 70 | 70 | 70 | 75 | 75 | 70 | 70 |
|  | jER 630 |  |  |  |  |  |  |  |  |
|  | jER 154 |  |  |  |  |  |  |  |  |
| Thermoplastic resin to be dissolved in the epoxy resin [D] | Virantage 10700 | 30 | 20 | 20 | 20 | 20 | 20 | 20 | 20 |
|  | PES 5003P |  |  |  |  |  |  |  |  |
| Thickening particle [E] | ZEFIAC F320 | 6 | 5 | 5 | 5 | 4 | 4 | 5 | 5 |
| Thermoplastic resin particle [D] | PA12 |  | 15 | 15 | 15 |  |  | 15 | 15 |
|  | PA1010 | 10 |  |  |  |  |  |  |  |
|  | PA11 |  |  |  |  | 20 | 20 |  |  |
|  | TR55 |  |  |  |  |  |  |  |  |
| Dicyandiamide [C] | DICY | 3 | 2 | 2 | 2 | 4 | 4 | 2 | 2 |
| Urea-based curing accelerator | OMICURE 24 |  | 3 | 3 | 3 | 5 | 5 | 3 | 3 |
|  | DOMU-99 |  |  |  |  |  |  |  |  |
|  | 2E4MZ | 4 |  |  |  |  |  |  |  |
| Aromatic amino [B] | CUREHARD-MED | 5 |  |  |  |  |  |  |  |
|  | M-DEA |  | 8 |  |  |  |  |  |  |
|  | M-MIPA |  |  | 8 |  | 1 | 30 |  |  |
|  | M-CDEA |  |  |  | 8 |  |  |  |  |
| Other curing agents | 3,3'-DCS |  |  |  |  |  |  | 7 |  |
|  | 4,4'-DDS |  |  |  |  |  |  |  | 7 |
| Gel time (150° C.) | Minutes | 2.0 | 3.8 | 4.2 | 4.0 | 2.0 | 5.8 | 2.5 | 2.5 |
| Glass transition temperature | ° C. | 172 | 187 | 190 | 189 | 181 | 183 | 200 | 201 |
| Water absorption [121° C., 100% RH, 24 h] | % by mass | 1.3 | 0.9 | 1.0 | 0.9 | 1.7 | 1.7 | 1.3 | 1.8 |
| 0° compressive strength [Dry, RT] | MPa | 1500 | 1500 | 1540 | 1500 | 1520 | 1540 | 1520 | 1550 |
| 0° compressive strength [Wet, 70° C.] | MPa | 1100 | 1120 | 1150 | 1110 | 1010 | 1120 | 970 | 990 |
| Press moldability | — | ○ | ○ | ○ | ○ | ○ | ○ | ○ | ○ |
| 0° compressive strength reduction ratio | % | 26.7 | 25.3 | 25.3 | 26.0 | 33.6 | 27.3 | 36.2 | 36.1 |

TABLE 4-continued

|  |  | Example 22 | Example 23 | Example 24 | Example 25 | Example 26 | Example 27 | Comparative Example 3 | Comparative Example 4 |
|---|---|---|---|---|---|---|---|---|---|
| Thickening initiation temperature (T1) | °C. | 95 | 99 | 98 | 99 | 100 | 101 | 101 | 99 |
| Thickening completion temperature (T2) | °C. | 112 | 113 | 113 | 112 | 113 | 111 | 113 | 112 |
| Curing initiation temperature (T3) | °C. | 120 | 120 | 120 | 121 | 122 | 120 | 120 | 120 |
| Viscosity at the time of thickening completion (η2) | Pa · s | 172 | 102 | 105 | 101 | 72 | 46 | 25 | 24 |
| Viscosity at 50° C. | Pa · s | 647 | 352 | 349 | 340 | 343 | 342 | 338 | 336 |

TABLE 5

|  |  | Example 28 | Example 29 |
|---|---|---|---|
| Epoxy resin [A] | jER 828 | 20 | 10 |
|  | jER 604 | 37.5 | 50 |
|  | jER 630 | 20 | 25 |
| Thickening particle [E] | ZEFIAC F320 | 4 | 5 |
| Dicyandiamide [C] | Dicy7 | 3 | 2 |
| Urea-based curing accelerator | OMICURE 24 | 3 | 3 |
| Aromatic amine [B] | CUREHARD-MED | 10 | 11 |
| Second curing agent | IPDA | 6.5 |  |
|  | PACM |  | 7.5 |
| Core-shell rubber | MX-416 | 30 | 20 |
| Amount of glycidyl amine type epoxy in epoxy resin (% by mass) |  | 80 | 90 |
| Content of the second curing agent (active hydrogen equivalent/the total amount of the epoxy groups) |  | 0.21 | 0.17 |
| Viscosity at 50° C. after thickening (Pa · s) |  | 320 | 245 |
| Gel time (150° C.) |  | 3.0 | 3.2 |
| Glass transition temperature Tg (° C.) |  | 178 | 180 |
| Water absorption [120° C., 100% RH, 24 h] |  | 1.1 | 1.1 |
| 0° compressive strength [Dry, RT] |  | 1470 | 1480 |
| 0° compressive strength [Wet, 70° C.] |  | 1070 | 1090 |
| Press moldability |  | ○ | ○ |
| 0° compressive strength reduction ratio |  | 27.2% | 26.4% |

The invention claimed is:

1. A prepreg comprising:
a fiber-reinforced substrate composed of a carbon fiber;
an epoxy resin composition with which the fiber-reinforced substrate is partially or wholly impregnated,
wherein a gel time of the epoxy resin composition at 150° C. is 300 seconds or less, and
wherein the epoxy resin composition includes an epoxy resin, a dicyandiamide, a urea-based accelerator and an aromatic amine represented by the following Formula (1),

[Chemical Formula 1]

Chemical Formula (1)

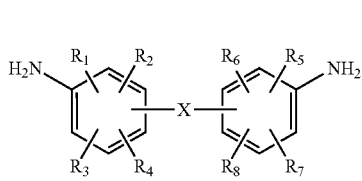

wherein the aromatic amine has at least one substituent other than a hydrogen atom in an ortho position with respect to an amino group, and, in Chemical Formula (1), $R_1$ to $R_8$ each independently represent any of a hydrogen atom, an aliphatic substituent having 1 to 6 carbon atoms, an aromatic substituent, and a halogen atom, at least one of the substituents is the aliphatic substituent having 1 to 6 carbon atoms, and X represents any of —$CH_2$—, —$CH(CH_3)$—, —$C(CH_3)_2$—, —S—, —O—, —CO—, —CONH—, and —C(=O)—, and wherein the blending amount of the aromatic amine is from 3 to 20 parts by mass with respect to 100 parts by mass of the total epoxy resin,
the blending amount of the dicyandiamide is from 1 to 4 parts by mass with respect to 100 parts by mass of the total epoxy resin, and
the blending amount of the urea-based accelerator is from 3 to 7 parts by mass with respect to 100 parts by mass of the total epoxy resin, and
wherein
an epoxy resin in the epoxy resin composition consists essentially of two or more epoxy resins selected from bisphenol epoxy resins, alcohol epoxy resins, biphenyl epoxy resins, hydrophthalic acid epoxy resins, dimer acid epoxy resins, alicyclic epoxy resins, tetrafunctional epoxy resins having a glycidyl amine structure, naphthalene epoxy resins and novolac epoxy resins, and
the blending amount of the tetrafunctional epoxy resins having a glycidyl amine structure is from 50 to 75 parts by mass with respect to 100 parts by mass of the total epoxy resin.

2. The prepreg according to claim 1, wherein the epoxy resin composition further includes a thickening particle formed from a polymer having one or two or more monomer units selected from a group consisting of a methacrylic acid ester compound, an acrylic acid ester compound, and a vinyl compound.

3. A carbon fiber-reinforced composite material obtained by curing the prepreg according to claim 2, wherein a 0° compressive strength reduction ratio is 30% or less.

4. The carbon fiber-reinforced composite material according to claim 3, wherein a water absorption is 1.5% by mass or less.

5. The prepreg according to claim 1, wherein the epoxy resin composition further includes a thermoplastic resin.

6. A carbon fiber-reinforced composite material obtained by curing the prepreg according to claim 5, wherein a 0° compressive strength reduction ratio is 30% or less.

7. The carbon fiber-reinforced composite material according to claim 6, wherein a water absorption is 1.5% by mass or less.

8. A carbon fiber-reinforced composite material obtained by curing the prepreg according to claim 1, wherein a 0° compressive strength reduction ratio is 30% or less.

9. The carbon fiber-reinforced composite material according to claim 8, wherein a water absorption is 1.5% by mass or less.

10. The prepreg according to claim 1, wherein the blending amount of the dicyandiamide is from 2 to 4 parts by mass with respect to 100 parts by mass of the total epoxy resin.

11. The prepreg according to claim 1, wherein the epoxy resin in the epoxy resin composition consists essentially of one or more tetrafunctional epoxy resins having a glycidyl amine structure and one epoxy resin selected from bisphenol epoxy resins, alcohol epoxy resins, biphenyl epoxy resins, hydrophthalic acid epoxy resins, dimer acid epoxy resins, alicyclic epoxy resins, naphthalene epoxy resins and novolac epoxy resins.

12. The prepreg according to claim 1, wherein the epoxy resin in the epoxy resin composition consists essentially of one or more tetrafunctional epoxy resins having a glycidyl amine structure and two or more epoxy resins selected from bisphenol epoxy resins, alcohol epoxy resins, biphenyl epoxy resins, hydrophthalic acid epoxy resins, dimer acid epoxy resins, alicyclic epoxy resins, naphthalene epoxy resins and novolac epoxy resins.

13. The prepreg according to claim 1, wherein the epoxy resin in the epoxy resin composition consists essentially of one or more tetrafunctional epoxy resins having a glycidyl amine structure and one or more epoxy resins selected from bisphenol epoxy resins, alcohol epoxy resins, biphenyl epoxy resins, hydrophthalic acid epoxy resins, dimer acid epoxy resins, alicyclic epoxy resins, naphthalene epoxy resins and novolac epoxy resins,
 wherein the one or more tetrafunctional epoxy resins having a glycidyl amine structure is tetraglycidyl diaminodiphenylmethane.

* * * * *